United States Patent
Zamir et al.

(10) Patent No.: US 12,216,756 B2
(45) Date of Patent: Feb. 4, 2025

(54) LAST RESORT SAFE SCHEMA

(71) Applicant: DELL PRODUCTS L.P., Round Rock, TX (US)

(72) Inventors: Amos Zamir, Beer Sheva (IL); Stav Sapir, Beer Sheva, IL (US)

(73) Assignee: DELL PRODUCTS L.P., Round Rock, TX (US)

( * ) Notice: Subject to any disclaimer, the term of this patent is extended or adjusted under 35 U.S.C. 154(b) by 278 days.

(21) Appl. No.: 17/974,883

(22) Filed: Oct. 27, 2022

(65) Prior Publication Data

US 2024/0143731 A1    May 2, 2024

(51) Int. Cl.
*G06F 21/45* (2013.01)
*H04L 9/32* (2006.01)

(52) U.S. Cl.
CPC ............ *G06F 21/45* (2013.01); *H04L 9/3263* (2013.01); *G06F 2221/2103* (2013.01); *G06F 2221/2141* (2013.01)

(58) Field of Classification Search
CPC ..... G06F 21/45; G06F 2221/2103; H04L 9/32
See application file for complete search history.

(56) References Cited

U.S. PATENT DOCUMENTS

| | | | | |
|---|---|---|---|---|
| 2009/0307748 | A1* | 12/2009 | Blom | H04L 9/3236 726/2 |
| 2013/0347089 | A1* | 12/2013 | Bailey | H04L 63/18 726/7 |
| 2022/0166762 | A1* | 5/2022 | Srour | G01R 1/28 |

* cited by examiner

*Primary Examiner* — Nicholas P Celani
(74) *Attorney, Agent, or Firm* — BAUGH LAW LLC

(57) ABSTRACT

Presented herein are systems and methods for enabling and providing safe and secure last resort access to a computing system. Embodiments may leverage trusted platform modules that exists in information handling systems to provide a more convenient and more secure rescue account. In one or more embodiments, the last resort access may be based on federated approval from a vendor/provider and a customer. In one or more embodiments, part of the cryptographic information is stored/controlled by a provisioner (or vendor), and another part is stored/controlled by the customer. Since both parts are involved in the last resort access process in order to gain access, neither entity alone can gain access to the information handling system.

20 Claims, 7 Drawing Sheets

LAST RESORT SAFE SCHEMA

BACKGROUND

A. Technical Field

The present disclosure relates generally to information handling systems. More particularly, the present disclosure relates to security and recoverability in systems.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, networking systems, and software systems.

As the number and capabilities of malicious actors has increased, security features have had to become more involved. For example, a single authentication factor is typically not sufficient anymore, and applications have started to add more factors to the authentication process. While the authentication process has been more secure, the configuration has also been more complex, prone to errors, and needs more attention and maintenance from the IT (information technology) department. Each misuse or inappropriate configuration can block the system from being used since all the users cannot be authenticated, even administrators.

For this special case, many products have developed a last resort (LR) method that allows administrators to fix the settings of the authentication without having to pass through a regular authentication process. This last resort option is also known as a "break the glass" process. From a serviceability concern, having a last resort option is crucial and should be supported in each product. However, from a security perspective, such an approach is considered a back door, and an inappropriate design that could create a vulnerability which an attacker can leverage to compromise the system.

Accordingly, it is highly desirable to find new, more efficient ways to provide secure systems but with a fallback or last resort mechanism that allows access when needed.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
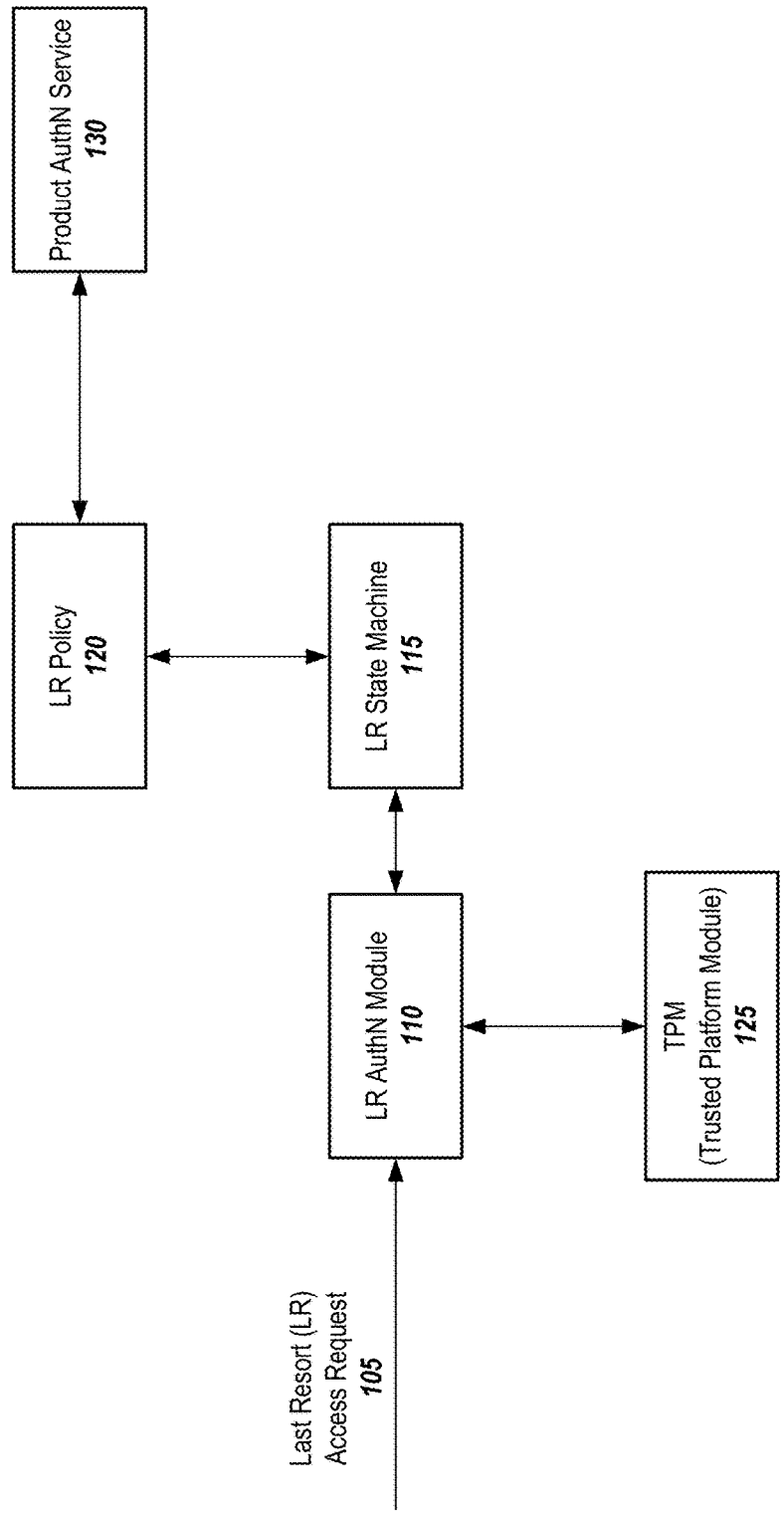
FIG. 1 ("FIG. 1") depicts components that enable or support a last resort access process, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment.

Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of data centers or networks, aspects of the present disclosure are not so limited. Accordingly, the aspects of the present disclosure may be applied or adapted for use in other contexts.

A. General Background

For a system design, a rescue account (also known as a last resort account or break-the-glass option) is a process of gaining access to a service account without passing through a regular authentication process. The service account may be used as an emergency access and can provide an administrator with special tools or access to scripts that allows modifying critical settings that are related to authentication or authorization. In most of the cases, the access is not provided using a regular port and typically requires some physical access to the information handling system or direct access to the host of the application. However, providing physical access to infrastructure and equipment is not only inconvenient and also has its own risks, as it creates its own weak points in the system.

Since the sensitivity of using a special "last resort" account is high, it should be carefully monitored and managed, appropriate audits trail should be created each time it is used, and it should unavailable except under limited circumstances. In addition, the credentials/key of this service account should be well protected. Sometimes the credentials/key are physically protected, in which the credentials/key is preserved in a physical safe box or sealed envelope.

Another approach to handling the security of last resort accounts is where multiple parties are required to unlock multiple combinations. A primary idea is to lower the risk by spreading the access across multiple parties such that if one of the parties is compromised or failed to keep its portion of the combination secret, the system is not able to be attacked.

It must be noted that usage of a rescue account should be extremely rare. Preferably, a rescue account should only be allowed in very specific and certain conditions. There should be no reason to enable the rescue service account if the administrators and the operators of the system are able to login and change the settings of the system with their account. Thus, the rescue/service account should be enabled only after the system is locked down or after certain condition(s). In one or more embodiments, those conditions may be configured according to one or more security policies that an organization defines and manages. While attackers may want to take advantage of the potential weakness created by having a rescue account (e.g., may try to provoke the conditions that enable the rescue account), it is still preferable than keeping the rescue account constantly enabled. Thus, in one or more embodiments, enabling a rescue account only when the system cannot be accessed by the administrators is preferable and reduces the risk of been used by unauthorized person.

Even with a rescue account that is only active under certain limited situations and despite treating a rescue account with high sensitivity, there are still high risks. Currently, there are no systematic solutions that solves or focuses on the crucial processes a system should have that has a rescue or last resort account. Accordingly, presented herein are embodiments of secure and safe systems and methods that the leverage trusted platform modules that exists in information handling systems (e.g., laptops and server) today to provide a more convenient and more secure rescue account.

B. Embodiments of Systems and Methods for Access Via Last Resort

Given a system that has an authentication process, it is desirable to be able support a last resort access in a secure way. To address this issue, presented below are embodiments of a general system and methods for last resort access.

1. System Embodiments

FIG. 1 depicts a last resort system, according to embodiments of the present disclosure. As illustrated, the system 100 may comprise several main components: a last resort (LR) authentication (AuthN) module 110 for emergency access, a LR state machine component 115, and a LR policy management module 120. Also depicted in FIG. 1 is a product authentication (AuthN) service 130, which is a service that may authenticate access (e.g., regular access and LR access) of users and may send access audits to the LR policy component 120. In one or more embodiments, the LR policy management module 120 is responsible for analyzing the access audits and for deriving a decision whether to allow LR access. A LR state machine 115 may hold the state of the LR system. During an authentication request 105 from an LR access point, the LR AuthN module 110 may only start a handshake session if the LR state machine has enabled that access.

In the depicted embodiments of FIG. 1, this system 100 utilizes a secure platform, such as a Trusted Platform Module (TPM) 120. TPM, or other such similar secure platform, is a security technology that increases an information handling system's security against vulnerabilities and provides added security. A secure platform, like a TPM, typically supports multiple features that increase the security including such features as memory encryption that encrypts a computer's drive to keep data safe; data execution prevention, which prevents unauthorized applications like malware from running in memory; secure booting to block malicious drivers and rootkits from intercepting the boot process of an Operating System (OS); and secure authentication. While embodiments discussed herein contemplate that a secure platform module exists and is leverage for better security, it shall be noted that the secure platform functionality utilized in embodiments herein may be performed by any other key management/vault component or system. It shall also be noted that the components of FIG. 1 may be components specially or specifically for providing last resort access; or alternatively, one or more of the components may serve additional purposes as well. For example, the authentication module 110 may be used for other authentication activities as well as LR authentication.

Figure 2:
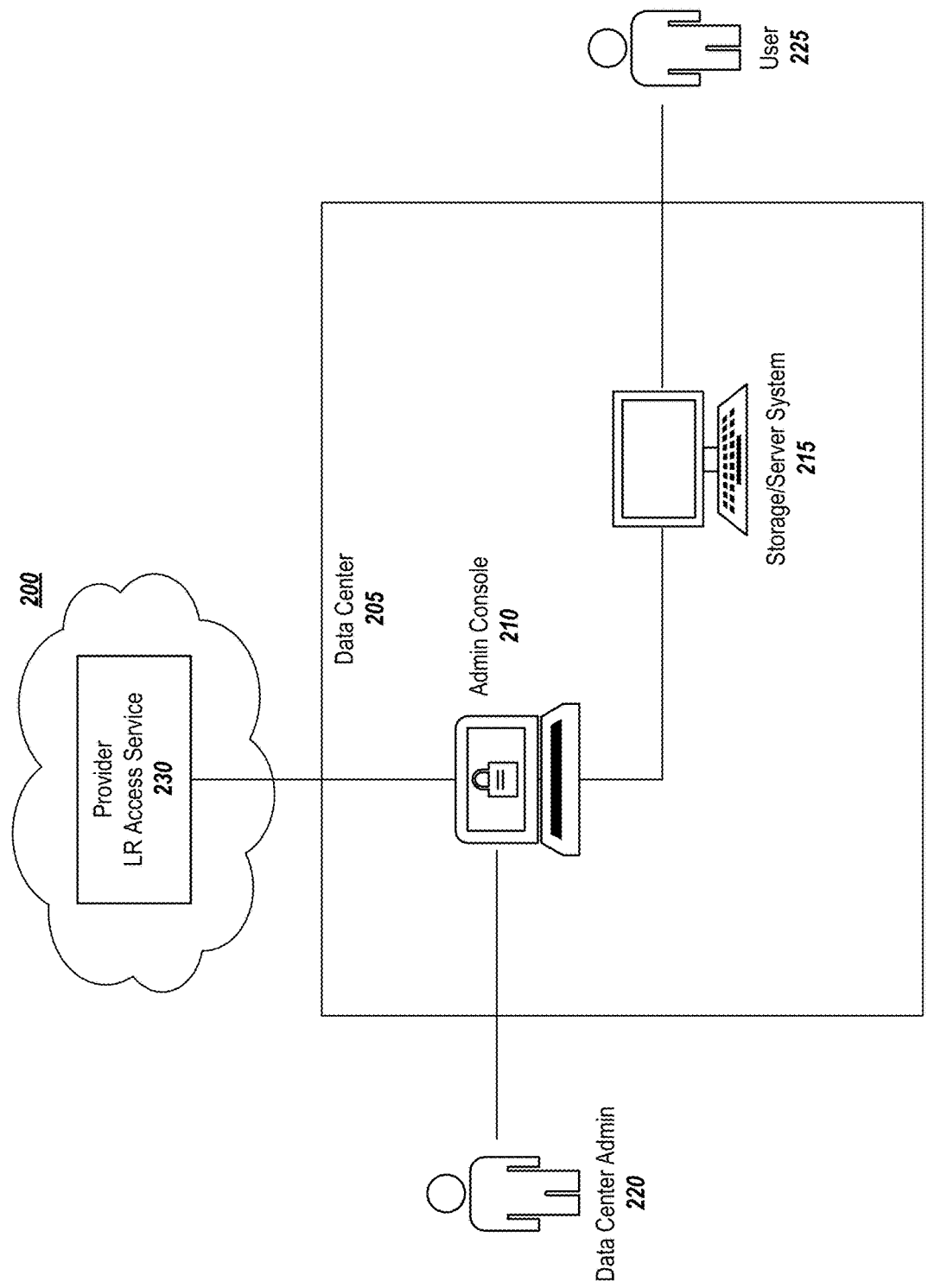
FIG. 2 graphically depicts the various entities involved in a last resort access process, according to embodiments of the present disclosure.

FIG. 2 graphically depicts the various entities of a last resort implementation, according to embodiments of the present disclosure. As illustrated in FIG. 2, an entity's data center 205 may comprise a storage server system 215 and an admin console interface 210. A user 225, when properly logged in, is able to access an account on the storage/server system 215. However, in one or more embodiments, in the event that both the user 225 and the data center administrator 220 are both unable to access an account or accounts on the data center 205, a last resort access process may be implemented to allow the administrator 220 to gain access. Having gained access, the administrator may reset or add normal access to one or more of the following: the administrator 220, the user 225, and a third-party (e.g., a third-party administrator that manages the user's account).

It shall be noted that embodiments of a last resort access schema or process comprise splitting cryptographic access elements between the administrator 220, an information handling system or systems (e.g., admin console 210 and/or storage/server system 215) at the data center, and a provider (e.g., an equipment provided that provides equipment to or for the data center) via its last resort access service 230. For example, in one or more embodiments:

- a secure platform private key is securely (and solely) maintained at an information handling system (e.g., at the admin console 210, the storage/server system 215, or some other information handling system not depicted that is accessible via the admin console 210) at the data center 205;
- last resort metadata, which includes at least one piece of data known only to the provider (e.g., an authentication value or code which was used in generating the asymmetric key pair of which the secure platform private key is one of the keys) is maintained at a last resort access storage (e.g., as part of the LR Access Service(s) 230); and
- a user/administrator that has/has access to a separate asymmetric key pair and is able to obtain access to the secure platform public key of the asymmetric key pair.

2. Method Embodiments

Given an LR authentication system, such as like the systems depicted in FIG. 1 and FIG. 2, method embodiments may be implemented for device initialization and authentication handshake processes that leverage a secure platform (e.g., a TPM) with secret sharing between the customer and a provider's (e.g., Dell's) system to protect the LR access.

a) Last Resort Access Initialization Embodiments

In one or more embodiments, to enable last resort ability, a secure platform (such as a TPM or TPM-like system) on a targeted information handling system is set with an asymmetric key pair (T.public/T.private) protected by authentication value (Auth_Value) that is used during the last resort access authentication process, such as for example using the TPM 2.0 HMAC (Hash-Based Message Authentication Codes) authorization process or flow. In one or more embodiments, the authentication value (Auth_Value) is unique per each information handling system (or device). Random generators with good entropy source may be used to generate the authentication value.

Figure 3:
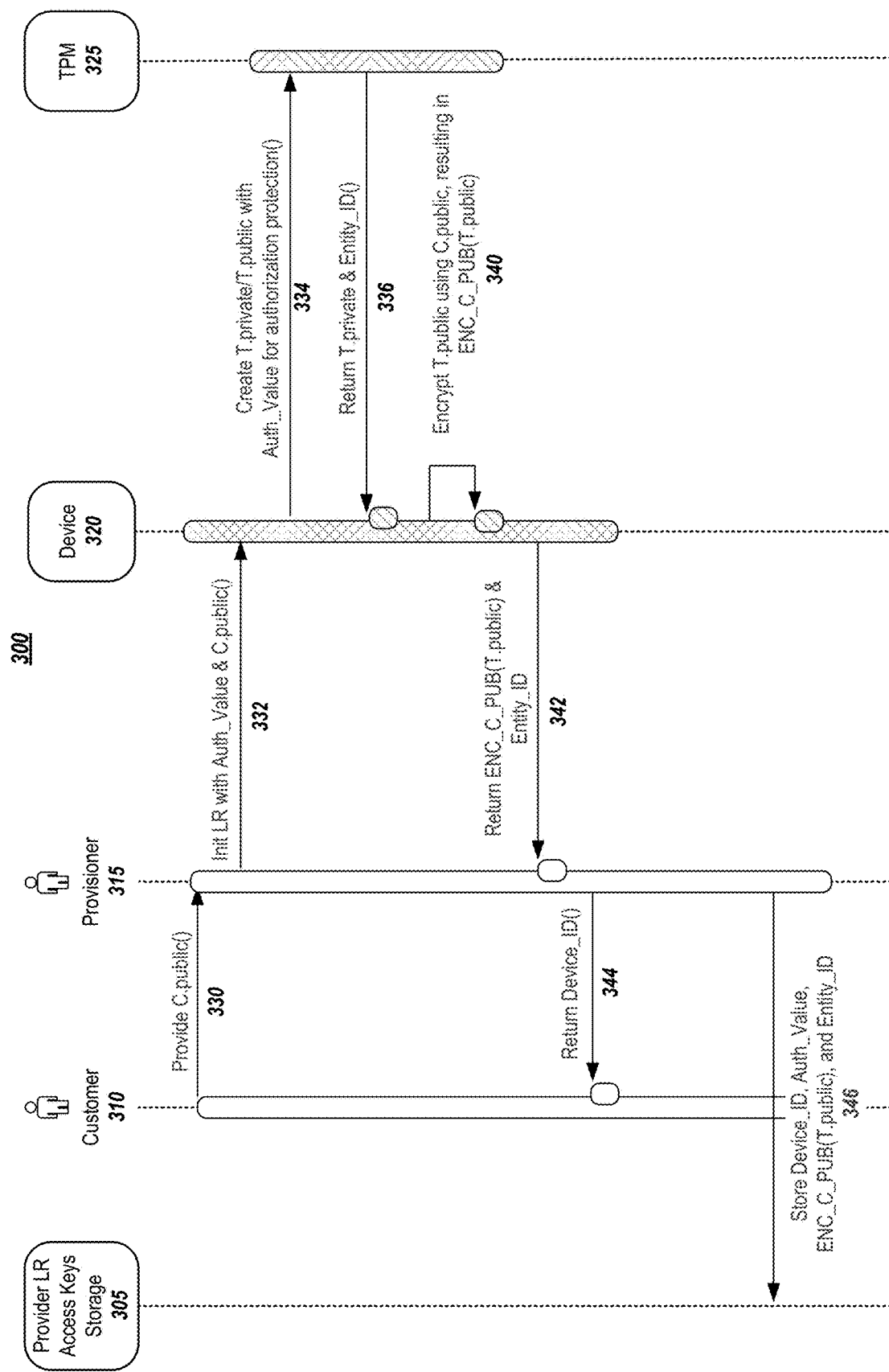
FIG. 3 depicts a last resort access initialization process, according to embodiments of the present disclosure.

FIG. 3 depicts a method flow for initialization of a last resort access implementation, according to embodiments of the present disclosure. In one or more embodiments, a customer 310 of an equipment supplier or provisioner 315 supplies (330) their public key (C.public) to the provisioner 315. The public key is a key that will be used as a key encryption key (KEK) to encrypt a public key (T.public) generated by a secure platform (e.g., a TPM 325) on an information handling system (or device) 320. In one or more embodiments, the private key (T.private) is kept solely in the secure platform 325 for security reasons. Because the private key never leaves the secure platform 325, it makes it extremely difficult (if not impossible) for malicious actors to obtain access.

As depicted in the illustrated embodiment of FIG. 3, the provisioner 315 starts the last resort access initialization process by supplying (332) the information handling system 320 process with the authentication value (Auth_Value), which is preferably unique to each last resort access initialization, each information handling system, and/or each end customer. The information handling system 320, with the aid of its secure platform 325 (which may be on the information handling system 320 or accessible by the information handling system 320), uses the authentication value (Auth_Value) to generate (334) an asymmetric key pair, which comprises a secure platform private key (T.private) and a corresponding secure platform public key (T.public). In one or more embodiments, the secure platform public key (T.public) and an entity identifier (Entity_ID) is returned (336) by the secure platform 325 to the general information handling system computing system 320. In one or more embodiments, the entity identifier is a unique identifier of the asymmetric key pair or of the secure platform private key.

The secure platform entity 325 securely stores the private key (T.private) (e.g., stored in the TPM 2.0). Note that, in one or more embodiments, the secure platform private key (T.private) never leaves the secure platform 325 and is therefore kept secret—even from the provisioner 315, who typically is in possession of the information handling system at this stage.

In one or more embodiments, the information handling system 320 uses the customer's public key (C.public) to encrypt (340) the secure platform key (ENC_C_PUB(T.public)) and sends (342) the secure platform key in its encrypted form (ENC_C_PUB(T.public)) and the entity identifier to the provisioner 315. The provisioner has a last resort access key and metadata stored (346) in a storage 305 for future use. In one or more embodiments, the last resort access metadata comprises the encrypted secure platform public key (ENC_C_PUB(T.public)) and may also include the Auth_Value, the Entity_ID, and a device identifier (Device_ID). In one or more embodiments, the device identifier is used to identify the information handling system or this last resort access initialization process (which may include being linked to this information handling system, this information handling system and this user, or other related information). As illustrated in FIG. 3, in one or more embodiments, the device identifier (Device_ID) is also given (344) to the customer as a unique identifier for this last resort access initialization process.

It shall be noted that the process is highly sensitive. In one or more embodiments, the last resort access initialization process may be performed by the provisioner 315 with direct/physical access to the information handling system and is performed by authorized personal. This process removes or mitigates the need of having trust in the provisioner (service/application) and the provision code on the information handling system that generates the entity public key (T.public) because the computing device encrypts the secure platform public key with the customer's KEK (C.public). Also addition to the security, the provisioner does not have access to the entity's secure public key (T.public) nor does it keep it in any medium.

In one or more embodiments, following the process of configuring the last resort access keys and metadata, the provisioner may ship or otherwise provide the customer with access to the information handling system, which includes providing access to the secure platform that stores the secure platform private key.

Last Resort Access Keys Storage Embodiments. In one or more embodiments, the access keys and metadata described above should be stored securely with CIA (confidentiality, integrity, and availability) principals. One part is stored by the provisioner (i.e., the Auth_Value), and the other part is stored by the customer (i.e., the customer's private key corresponding to its public key). Note that using such a configuration, neither entity alone (i.e., neither the provisioner nor the customer) can gain access to an account via the information handling system—they need to collaborate to facilitate last resort access.

Last Resort Access State Trigger Embodiments. In one or more embodiments, one or more different policies may be set and applied as part of the last resort access process. One or more of the policies may be based on access audit(s) and/or other collected data (which may include utilizing other information or data from additional sources). For example, in one or more embodiments, the last resort access process may be set by default to be unavailable unless one or more conditions trigger activation—such as requiring several failed logins from two or more different administrators before the last resort access process is enabled. Additionally or alternatively, a policy may require that a state of an interface (e.g., a soft button or a physical button) that exist on a specific information handling system be changed (i.e., a person must be physically present and pressing the button). Since data centers tend to be secure facilities, only authorized people can gain access. Requiring that an authorized person be on-site and pressing a button adds additional security. Another example of a policy may be that the last resort access process may only be enabled during business hours. Additionally, multi-factor authentication may be employed. One skilled in the art shall recognize other policies or conditions that may be implemented as part of a last resort access process.

b) Last Resort Access Process Embodiments

Figure 4A:
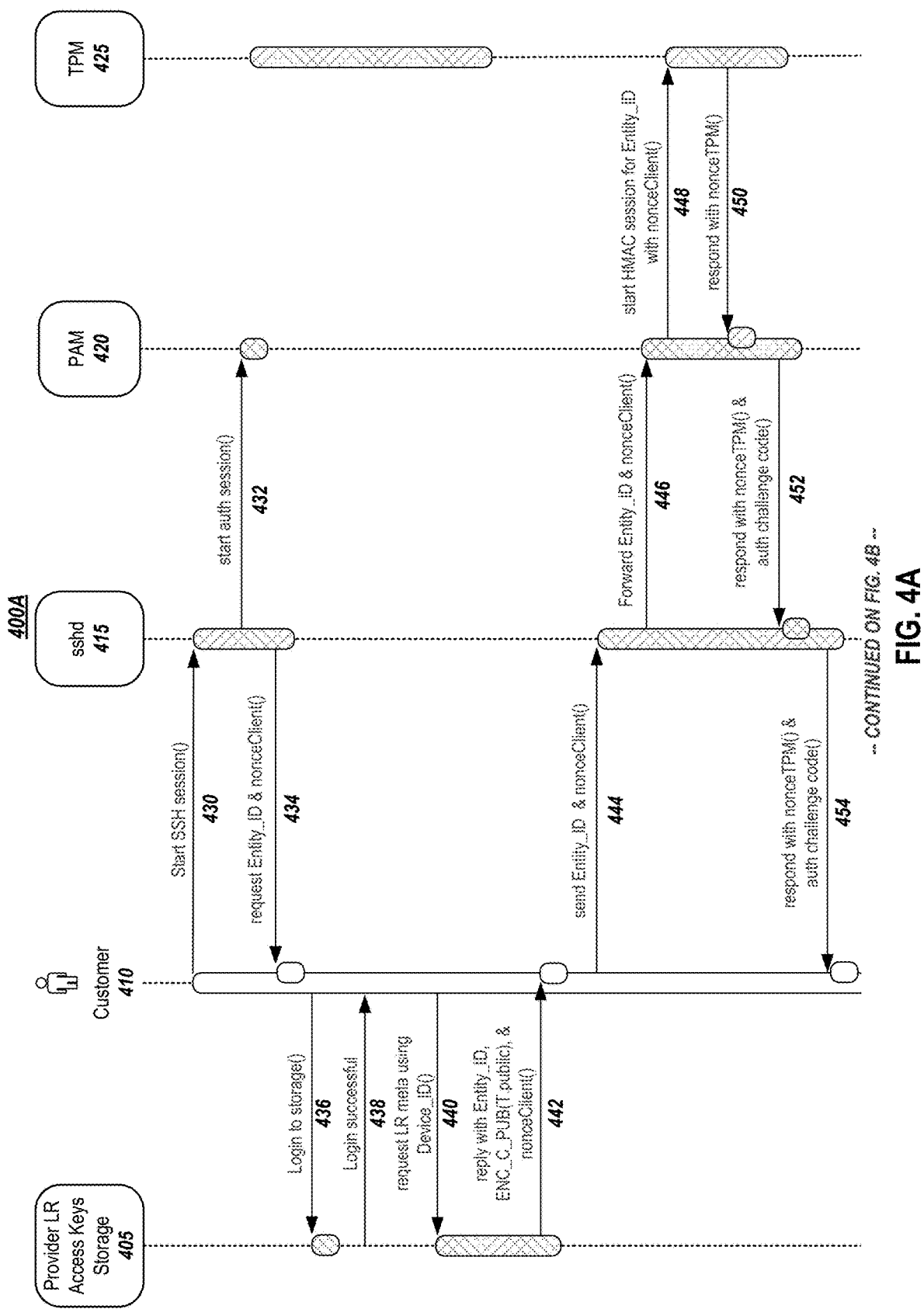
FIGS. 4A & 4B depict a last resort access process, according to embodiments of the present disclosure.
Figure 4B:
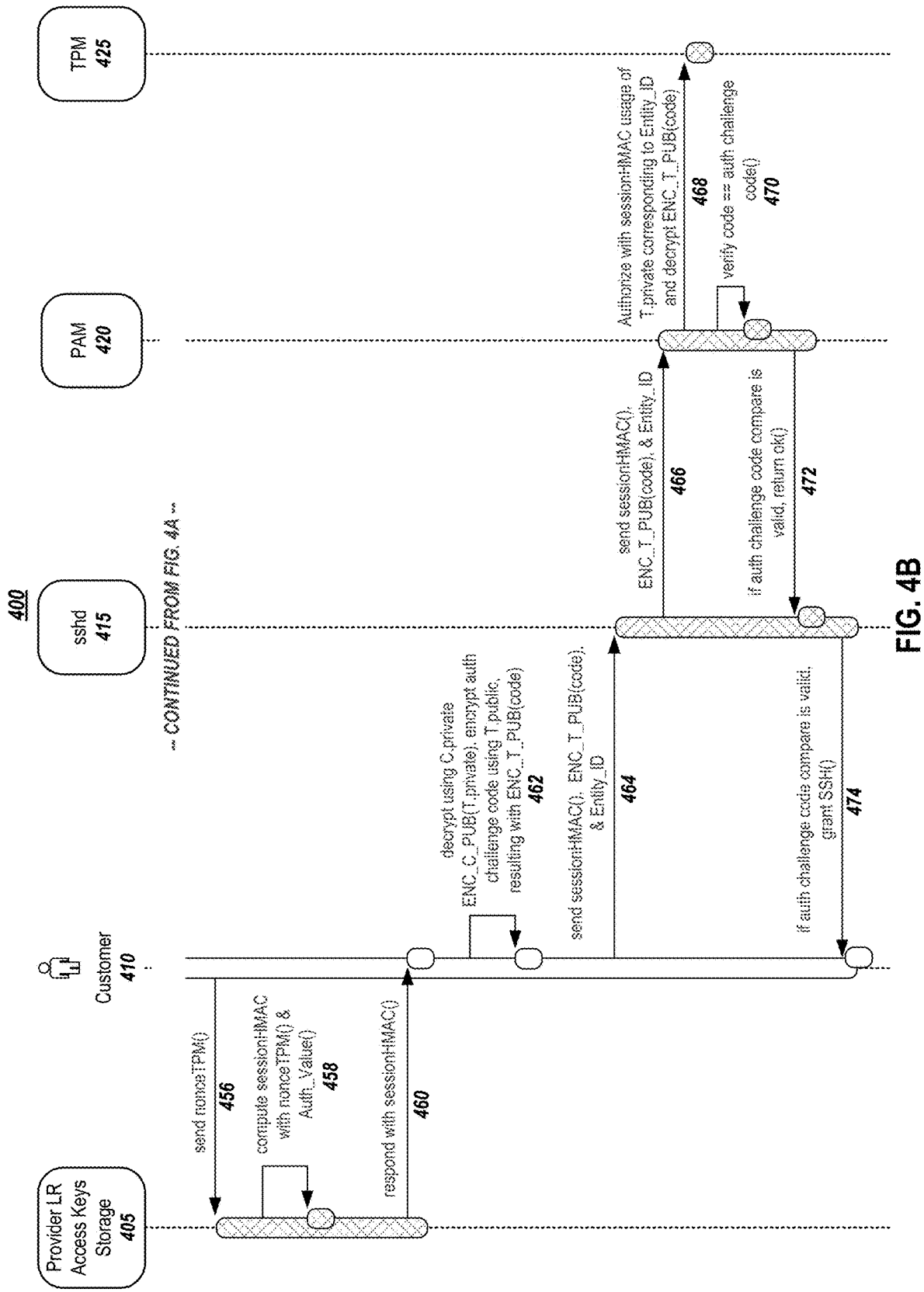

If a user or admin is locked out, with no other ability to reset access, a last resort access process using the keys discussed above may be implemented. FIGS. 4A and 4B depict a last resort access process, according to embodiments of the present disclosure.

Starting with FIG. 4A, after a customer 410 (which may also be referred to as an owner or client) decides that they need to initiate a last resort access process (e.g., init LR access), the customer 410 starts (430) a secure session. It shall be noted that, in one or more embodiments, the sshd 415, pluggable authentication module (PAM) 420, and TPM (secure platform) 425 are processes or components of an information handling system or device; however, it shall be noted that they may be distributed across one or more information handling systems.

In one or more embodiments, a secure shell (SSH) session may be initiated (430 and 432) with the information handling system. In the depicted implementation, the sshd 415 (an open source version of SSH) is protected by a PAM (pluggable authentication module) 420 that acts as a delegator for the secure platform 425 (which may be a TPM 2.0 module) remote access and leverage the secure platforms HMAC authorization mechanism (which may be one defined by the Trusted Computing Group (TCG)) to enforce authorized access to the secure platform entity (i.e., the secure platform private key, T.private) that is identified by the entity identifier, Entity_ID, which was set during the last resort access initialization process. As illustrated, the sshd 415 requests (434) that the customer 410 provide the entity identifier (Entity_ID) and a client nonce value (nonceClient).

In one or more embodiments, the customer 410 proves that they can access a secure platform private key entity (T.private) on the information handling system. As explained in more detail below, the secure platform private key (T.private) is used to decrypt an authentication challenge code that is given to the client during an authentication flow with the PAM module. In one or more embodiments, the customer also must establish that they are in possession of the customer's private key (C.private).

As part of this verification/authentication process, a customer authenticates (436/438) with a last resort access keys storage 405 via logging into the storage 405. In one or more embodiments, the last resort access keys storage 405 is responsible for computing an HMAC session to work with the TPM 425, since it is the only owner/possessor of the authentication value (Auth_Value) used in generating the asymmetric key pair. In one or more embodiments, following logging in, the customer 410 requests (442) certain last resort metadata (e.g., the entity identifier, the secure platform public key (which is in its encrypted form), and a client nonce value). The last resort access keys storage 405 provides (442) this information to the customer.

In one or more embodiments, before TPM session establishment, an authentication challenge code is given by the PAM module, and the client needs to encrypt the authentication challenge with its secure platform public key (T.public) corresponds to the secure private key (T.public) protected in the secure platform (e.g., TPM). Thus, steps 444-454 relate to the customer receiving the authentication challenge code from the PAM module 420.

Turning next to FIG. 4B, where the last resort access process continues, the customer sends (456) a secure platform nonce value, which was originated from the secure platform (see step 450), to the last resort access keys storage 405. The last resort access keys storage 405 generates (458) a session code and sends (460) it to the customer. In one or more embodiments, the session code is generated using the secure platform nonce value and the authentication value, which was used in creating the asymmetric key pair.

In one or more embodiments, the customer 410 decrypts (462) the encrypted secure platform public key (ENC_C_PUB(T.public)) using their private key (C.private) and encrypt the authentication challenge code with secure platform public key (T.public), which results in the authentication challenge code in encrypted form (ENC_T_PUB (code)). The customer then may send (464) the authentication challenge code in encrypted form (ENC_T_PUB (code)), the session code (session HMAC), and the entity identifier (Entity_ID) to the information handling system 415.

Responsive to receiving from the user/customer, the session code generated by the provider, the authentication challenge code (ENC_T_PUB(code)) in an encrypted form, and the entity identifier, the session code (session HMAC) is sent (466) with the ENC_T_PUB(code) to the PAM module. The PAM module 420 uses the session HMAC to authorize access to the private key (T.private) in the secure platform (425) corresponding to the Entity_ID to be able to decrypt (468) the ENC_T_PUB(code).

If the TPM session is successful and the code is decrypted, the PAM module 420 verifies (470) whether the code is the same as been initially challenged. Responsive to the decrypted authentication challenge code matching the original authentication challenge code, the information handling system grants (472, 474) the secure session for the customer. Thus, a valid SSH session is established to a service account for last resort activities. An admin of the customer may reset or establish an account for the admin, a user, or both. In one or more embodiments, following establishment of a normal account, the last resort access process may return to being in an inactive/not enable state, according to one or more policies.

Responsive to the decrypted authentication challenge code not matching the original authentication challenge code, the information handling system denies the secure session for the customer.

One skilled in the art shall recognize that a secure platform, such as a TPM 2.0 HMAC session, has strong replay attack protection and has been designed for remote password-less access to the TPM. For example, in one or more embodiments, the session HMAC may not be used again by the customer in the future since it will not be valid after the first use (strong replay attack protection).

Embodiments that involve binding to PAM authentication challenge code gives an additional layer of protection and insurance that the client performing the authentication is in possession of the private key (C.private), can decrypt the ENC_C_PUB(T.public), and then use T.public to encrypt the challenge code. The PAM module is able to decrypt the given encrypted code using T.private stored in secure platform. While embodiments may employ a PAM module, it shall be noted that one or more embodiments may not utilize a PAM module or its functionality may be implemented into other elements, such as the secure platform.

In the depicted example, the secure platform access is granted, at least in part, by the provider (HMAC session), and the PAM challenge is solved by the customer—each contribution to the authorization of SSH usage. The last resort access process cannot be done only by the provider (who does not have access to T.public) or by the customer alone (who does not have access to Auth_Value).

It shall be noted that one or more stages (e.g., step 436 client login) and/or the last resort access process may employ two (or more) factor authentication. It shall also be noted that all of the flows may be recorded and audited.

It shall also be noted that last resort access process embodiments may have an initial step or phase in which a check may be performed to determine whether last resort access is available. For example, a policy module and a state machine may monitor or receive system data and not grant a last resort access process unless a policy or policies have been satisfied.

C. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 5:
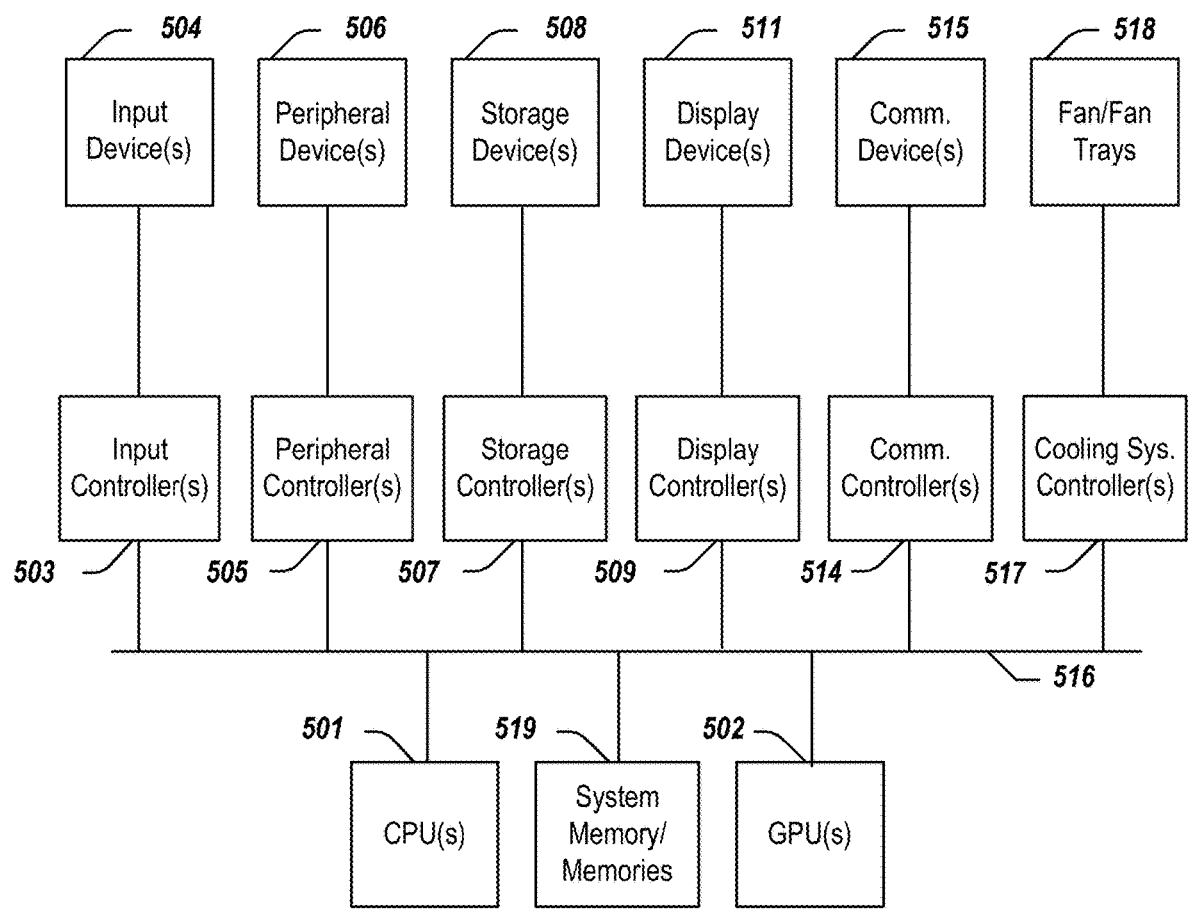
FIG. 5 depicts a simplified block diagram of an information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more CPUs 501 that provides computing resources and controls the computer. CPU 501 may be implemented with a microprocessor or the like and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, stylus, microphone, camera, trackpad, display, etc. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
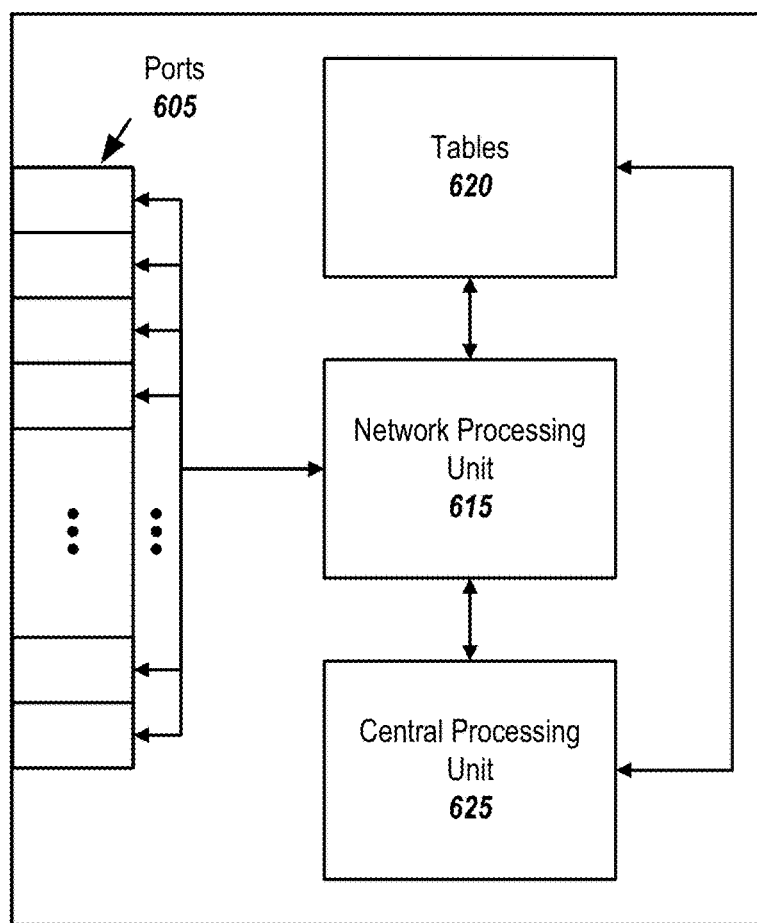
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a CPU 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
   receiving from a user a request to start a secure session with an information handling system to gain access to an account via a last resort access process;
   requesting from the user an entity identifier, which is a unique identifier associated with a secure platform private key stored on a secure platform associated with the information handling system, and a client nonce value;
   responsive to receiving from the user the client nonce value and the entity identifier, in which the entity identifier was obtained by the user following authentication to a last resort access keys storage maintained by a provider that was involved in a last resort access initialization process that established an asymmetric key pair comprising the secure platform private key and a secure platform public key, in which an encrypted form of the secure platform public having been encrypted using a public key of the user is stored in the last resort access keys storage, responding with a secure platform nonce value and an authentication challenge code; and
   responsive to receiving from the user a session code generated by the provider, the authentication challenge code in an encrypted form having been encrypted using the secure platform public key of the user, and the entity identifier:
      using the session code to authorize usage of secure platform private key corresponding to the entity identifier;
      using the secure platform private key to decrypt the authentication challenge code in encrypted form;
      responsive to the decrypted authentication challenge code matching the authentication challenge code, granting the secure session for the user; and
      responsive to the decrypted authentication challenge code not matching the authentication challenge code, denying the secure session for the user.

2. The computer-implemented method of claim 1 further comprising:
   responsive to receiving from the user the request to start a secure session:
      determining whether one or more conditions have been met according to one or more policies that set when the last resort access process is activated for use by the user;
      responsive to one or more conditions having not been met according to the one or more policies, denying the secure session for the user; and
      responsive to one or more conditions having been met according to the one or more policies, allowing the last resort access process to proceed.

3. The computer-implemented method of claim 2 wherein:
   at least one policy of the one or more policies utilizes data obtained related to the information handling system to determine whether one or more conditions have been met to activate the last resort access process.

4. The computer-implemented method of claim 2 wherein:
   at least one policy of the one or more policies comprises as a condition activation of a physical interface on a specific information handling system.

5. The computer-implemented method of claim 1 wherein the client nonce value is a unique value that is unique to the secure session.

6. The computer-implemented method of claim 1 wherein the user provides to the last resort access keys storage maintained by the provider a device identifier that is associated with the information handling system or with the information handling system and the user when requesting the entity identifier and the client nonce value.

7. The computer-implemented method of claim 1 wherein the session code generated by the provider is generated using an authentication value that was used in forming the asymmetric key pair.

8. The computer-implemented method of claim 1 wherein the last resort access initialization process comprises:
   responsive to receiving from the user the public key of the user, using the public key, an authentication value, and the secure platform of the information handling system to generate the asymmetric key pair comprising the secure platform private key, which is kept on the secure platform of the information handling system, and the secure platform public key;
   receiving from the information handling system the secure platform public key and the entity identifier, which is a unique identifier associated with the secure platform private key stored on the secure platform of the information handling system, in which at least the secure platform public key is received in an encrypted form having been encrypted using the public key of the user for encrypting;
   storing, for use for the last resort access process, the authentication value, the entity identifier, the secure platform public key in encrypted form having been encrypted using the public key of the user, and a device identifier associated with at least the information handling system; and
   providing to the user the device identifier.

9. The computer-implemented method of claim 8 wherein:
   the authentication value is unique to the information handling system.

10. The computer-implemented method of claim 8 wherein the secure platform is a trusted platform module (TPM).

11. A computer-implemented method comprising:
    responsive to receiving from a user a public key of the user, using the public key, an authentication value, and a secure platform of an information handling system to generate an asymmetric key pair comprising a secure platform private key, which is kept on the secure platform of the information handling system, and a secure platform public key;
    receiving from the information handling system the secure platform public key and an entity identifier, which is a unique identifier associated with the secure platform private key stored on the secure platform of the information handling system, in which at least the secure platform public key is received in an encrypted form having been encrypted using the public key of the user for encrypting;
    storing, for use for a last resort access process, the authentication value, the entity identifier, the secure platform public key in encrypted form having been encrypted using the public key of the user, and a device identifier associated with at least the information handling system in a last resort access key storage; and providing to the user the device identifier.

12. The computer-implemented method of claim 11 wherein:

the authentication value is unique to the information handling system.

13. The computer-implemented method of claim 11 wherein:

providing the user access to the secure platform private key securely stored in the secure platform.

14. The computer-implemented method of claim 11 further comprising:

responsive to receiving from a user a request to access information in the last resort access key storage, authenticating the user and only continuing in response to the user successfully being authenticated.

15. The computer-implemented method of claim 11 further comprising, as part of a last resort access flow:

receiving, from the user, the device identifier and a request to access information related to the device identifier in the last resort access key storage; and returning, to the user, the entity identifier, the secure platform public key in the encrypted form having been encrypted using the public key of the user, and a client nonce value.

16. The computer-implemented method of claim 15 further comprising:

receiving, from the user, a secure platform nonce value;

generating a session code using the authentication value that was used in forming the asymmetric key pair; and sending, to the user, the session code.

17. An information handling system comprising:

one or more processors;

a secure platform module comprising a secure platform private key, which is part of an asymmetric key pair comprising the secure platform private key and a secure platform public key;

one or more non-transitory computer-readable media comprising one or more sets of instructions which, when executed by at least one of the one or more processors, by the secure platform module, or a combination thereof, causes steps to be performed comprising:

receiving from a user a request to start a secure session with an information handling system to gain access to an account via a last resort access process;

requesting from the user an entity identifier, which is a unique identifier associated with a secure platform private key stored on a secure platform associated with the information handling system, and a client nonce value;

responsive to receiving from the user the client nonce value and the entity identifier, in which the entity identifier was obtained by the user following authentication to a last resort access keys storage maintained by a provider that was involved in a last resort access initialization process that established an asymmetric key pair comprising the secure platform private key and a secure platform public key, in which an encrypted form of the secure platform public having been encrypted using a public key of the user is stored in the last resort access keys storage, responding with a secure platform nonce value and an authentication challenge code; and responsive to receiving from the user a session code generated by the provider, the authentication challenge code in an encrypted form having been encrypted using the secure platform public key of the user, and the entity identifier:

using the session code to authorize usage of secure platform private key corresponding to the entity identifier;

using the secure platform private key to decrypt the authentication challenge code in encrypted form;

responsive to the decrypted authentication challenge code matching the authentication challenge code, granting the secure session for the user; and responsive to the decrypted authentication challenge code not matching the authentication challenge code, denying the secure session for the user.

18. The information handling system of claim 17 wherein at least one of the one or more non-transitory computer-readable media further comprises one or more sequences of instructions which, when executed by at least one of the one or more processors, by the secure platform module, or a combination thereof, causes steps to be performed comprising:

responsive to receiving from the user the request to start a secure session:

determining whether one or more conditions have been met according to one or more policies that set when the last resort access process is activated for use by the user;

responsive to one or more conditions having not been met according to the one or more policies, denying the secure session for the user; and responsive to one or more conditions having been met according to the one or more policies, allowing the last resort access process to proceed.

19. The information handling system of claim 18 wherein:

at least one policy of the one or more policies utilizes data obtained related to the information handling system to determine whether one or more conditions have been met to activate the last resort access process.

20. The information handling system of claim 17 wherein the session code generated by the provider is generated using an authentication value that was used in forming the asymmetric key pair.

\* \* \* \* \*